(12) United States Patent
Dunn et al.

(10) Patent No.: US 7,626,756 B2
(45) Date of Patent: Dec. 1, 2009

(54) COATING FOR OPTIMISING OUTPUT COUPLING OF EM RADIATION

(75) Inventors: Malcolm Dunn, Fife (GB); Cameron F. Rae, Fife (GB); Tom J. Edwards, Fife (GB); David J. M. Stothard, Fife (GB); David Walsh, Fife (GB)

(73) Assignee: The University Court of the University of St. Andrews, St. Andrews, Fife (GB)

( * ) Notice: Subject to any disclaimer, the term of this patent is extended or adjusted under 35 U.S.C. 154(b) by 0 days.

(21) Appl. No.: 12/096,524

(22) PCT Filed: Jan. 26, 2007

(86) PCT No.: PCT/GB2007/000295

§ 371 (c)(1),
(2), (4) Date: Jun. 6, 2008

(87) PCT Pub. No.: WO2007/088336

PCT Pub. Date: Aug. 9, 2007

(65) Prior Publication Data

US 2008/0298757 A1    Dec. 4, 2008

(30) Foreign Application Priority Data

Feb. 1, 2006    (GB) .................... 0601967.3

(51) Int. Cl.
*G02F 1/35* (2006.01)
*G02F 2/02* (2006.01)
*G02B 6/00* (2006.01)

(52) U.S. Cl. .................... 359/330; 385/122

(58) Field of Classification Search ......... 359/326–332; 385/122
See application file for complete search history.

(56) References Cited

U.S. PATENT DOCUMENTS

| 6,697,186 B2 * | 2/2004 | Kawase et al. ............... 359/330 |
| 6,903,341 B2 * | 6/2005 | Imai et al. ................... 250/340 |
| 2008/0298757 A1 * | 12/2008 | Dunn et al. .................. 385/122 |

OTHER PUBLICATIONS

International Search Report for corresponding PCT/GB2007-000295, completed Mar. 27, 2007 by Albert Smid of the EPO.
Kawase K et al: "*Terahertz Wave Parametric Source*"; Journal of Physics D. Applied Physics, IOP Publishing, Bristol, GB, vol. 35, No. 3, Feb. 7, 2002, pp. R1-R14, XP002348893, ISSN: 0022-3727, cited in the application See in particular: Chapter 4.; 4.1; the first two paragraphs of 4.2; and Fig. 11.
Kawase K, et al: "*Arrayed Silicon Prism Coupler for a Terahertz-Wave Parametric Oscillator*"; Applied Optics; vol. 40, No. 9, Mar. 20, 2001, pp. 1423-1426.
Yarborough, et al: "*Efficient, Tunable Optical Emission from LiNbO$_3$, without a Resonator*"; Applied Physics Letters; vol. 15, No. 3, pp. 102-105, Aug. 1, 1969.
Kawase, et al: "*Coherent Tunable THz-Wave Generation from LiNbO$_3$ with Monolithic Grating Coupler*"; Applied Physics Letters 68 (18), Apr. 29, 1996, pp. 2483-2485.

* cited by examiner

*Primary Examiner*—Daniel Petkovsek

(57) ABSTRACT

A coating between a nonlinear crystal and a silicon prism coupler, prevents transmission of radiation scattered within the crystal by filtering out frequencies outside the silicon bandgap to avoid free carrier absorption, but transmits THz frequencies that correspond to the bandgap.

10 Claims, 4 Drawing Sheets

PRIOR ART

PRIOR ART

PRIOR ART

COATING FOR OPTIMISING OUTPUT COUPLING OF EM RADIATION

The present invention relates to a device and method for optimising the output of electromagnetic radiation from a material, for example from a non-linear material in which the electromagnetic radiation is generated. A particularly important use is in the extraction of terahertz radiation from a non-linear material of high refractive index into free space, via an intermediate semi-insulator material device.

BACKGROUND OF THE INVENTION

When electromagnetic (em) radiation propagates from a first medium into a second medium, it is subject to the effects of optical refraction and Fresnel reflection, arising from any difference in the refractive index of the two media at the wavelength of the em-wave. With reference to FIG. 1(a), the magnitude of the optical refraction experienced by the em-wave in propagating from a first medium of refractive index n1 into a second medium of refractive index $n_2$ is described mathematically by: $n_1 \sin(\alpha_1) = n_2 \cdot \sin(\alpha_2)$, where $\alpha_1$ is the angle within the first medium at which the em-wave strikes the interface between the two media, and $\alpha_2$ is the angle within the second medium at which the em-wave transmitted through the interface leaves the interface, each angle being measured relative to the normal or perpendicular to the interface.

When n1 is greater than n2, then there exists some angle $\alpha$ for which when $\alpha_1$ equals $\alpha$ then $\alpha_2$ equals 90 degrees. When this condition exists the em-wave is guided along a direction parallel to the interface and not transmitted into the second medium. Further, when $\alpha_1$ is greater than $\alpha$, the em-wave is totally reflected at the interface resulting in the em-wave being returned into the first medium rather than being transmitted into the second medium, this being the principle of total internal reflection and used widely in fiber optic devices. While advantageous in fibre optic devices, the effect of total internal reflection can be detrimental to devices where transmission from a first medium of high refractive index into a second medium of low refractive index is desired.

With reference to FIG. 1(b), the magnitude of the component of the em-wave reflected from an interface between a first medium of refractive index n1 and a second medium of refractive index $n_2$ at or near normal incidence is approximated and described mathematically by: $R = (n_1 - n_2)^2 / (n_1 + n_2)^2$. When the difference between n1 and n2 is large, it is easily seen that the magnitude of the reflected component of the em-wave also becomes large. For example if $n_1$ is five and $n_2$ is one, then R is close to 45%. In many optical systems this is a detrimental loss and so means are sought to circumvent or mitigate the effect.

One solution, as shown in FIG. 1(c), is to insert an additional layer of material of intermediate refractive index ($n_3$), i.e. $n_2$ is less than n3 that is less than n1, between the first and second media. Excluding any affect due to interference between transmitted and reflected components, the total transmission is then given by the product of the transmissions of the em-wave propagating firstly from medium 1 into medium 3 then medium 3 into medium 2. For example, if $n_3$ equals three and $n_1$ and $n_2$ are as above, the total loss is reduced to close to 12%. If the interfaces between the media are substantially parallel and the intermediate layer made appropriately thin (typically a quarter of the wavelength of the em-wave) then it is the case that interference effects can be used to further reduce the magnitude of the reflected component to close to zero, this being the principle of operation of single-layer anti-reflection coatings.

A particular example of where it is advantageous to use a device of intermediate refractive index to improve coupling of an em-wave between media of high and low refractive index is in the extraction of terahertz (THz) wave radiation from a nonlinear crystal, where for example the THz radiation has been generated in the non-linear crystal through the process of parametric wave generation. FIG. 2(a) illustrates this, showing a coherent beam of electromagnetic radiation, referred to as the pump wave 4, used to stimulate a non-linear process in a non-linear optical material 5. This divides the energy/power of the coherent pump 4 into two newly generated parametric waves, typically referred to as the signal 6 and idler 7 waves. The signal wave is usually defined in the literature as the wave providing the useful output from the device, although that is not invariably the case. The ratio in which the pump energy/power is divided between the signal and idler waves is determined by phase-matching processes and is always subject to conservation of energy, where the energy of a pump wave photon is equal to the sum of the energies of the generated signal and idler wave photons.

Within these constraints, there is considerable interest in extending the spectral coverage of parametric devices. This is because they are often used as sources of coherent electromagnetic radiation in spectral regions either not covered by any other sources or where a single parametric-wave source is capable of replacing a number of sources that would otherwise be needed in order to provide the spectral coverage required. A serious limitation encountered in attempting to extend the spectral coverage of parametric generation to new regimes of the electromagnetic spectrum is the detrimental effect of absorption within the non-linear material of one or more of the three waves involved in the non-linear interaction. As a result the spectral coverage attainable with a particular parametric generation scheme is often determined by the onset of such absorption rather than by the non-linear or phase-matching characteristics of the non-linear material. Hence, it follows that elimination of such a restriction results in improved spectral coverage attainable through the parametric generation process.

One solution to the problem of absorption in the non-linear material is to employ a configuration of interacting waves such that the wave subject to excessive absorption exits the non-linear material as rapidly as possible after its generation. This wave is usually, but not invariably, the signal wave, and is usually, but not invariably, the wave with the longest wavelength of the three waves involved in the parametric process. Two principal methods for bringing this about have been identified. One of these is based on using non-collinear phase matching in such a way as to cause the wave subject to absorption, which as previously stated is usually the wanted signal wave, to rapidly walk out from the non-linear material in a direction that is substantially lateral to the propagation direction of the pump wave, as shown in FIG. 2(b).

In FIG. 2(b), the wavelength of the signal wave is substantially different from the wavelength of the pump wave and the idler wave is close to being collinear with the pump wave. Hence, the propagation direction of the signal wave is substantially lateral to the propagation direction of the idler wave as well as the pump wave.

Examples of this technique are described in the articles "Efficient, tunable optical emission from $LiNbO_3$ without a resonator", by Yarborough et al, Applied Physics Letters 15(3), pages 102-4 (1969); "Coherent tunable THz-wave generation from $LiNbO_3$ with monolithic grating coupler", by Kawase et al, Applied Physics Letters 68(18), pages 2483-

2485 (1996); and "Terahertz wave parametric source", by Kawase et al, Journal of Physics D: Applied Physics 35(3), pages R1-14 (2002), the contents of which are incorporated herein by reference.

FIG. 2(c) illustrates the phase-matching process for FIG. 2(b) through a so-called k-vector diagram where kp, ki, ks are the wave vectors of the pump, idler and signal respectively within the non-linear material 5, angle e is the angle subtended by the pump 4 and idler 7 waves and angle φ the angle subtended by pump wave 4 and signal wave 6. A difficulty with this approach is the extraction of the signal (THz) wave through the non-linear crystal to air interface, due to the previously described effect of total internal reflection. It is usual that the angle of incidence the signal wave makes with this interface is greater than that for which total internal reflection is observed.

One known approach, as described for example by Kawase et al, Applied Optics 40(9), pages 1423-1426 (2001), to avoid reflection at the non-linear crystal to air interface is to apply to the interface a device fabricated from the semi-insulator material silicon, this having a intermediate refractive index ($n_3$) of around 3.2, so that the total internal reflection condition ($\alpha$) at the now non-linear crystal to silicon device interface is greater than the THz (signal) wave angle of incidence. Thus, the THz wave propagates through the interface, albeit with some loss due to Fresnel reflection.

If a silicon device having a second surface opposite and parallel to the first non-linear crystal to silicon interface surface is used, the problem of total internal reflection would be translated to this silicon to air interface. With reference to FIG. 3(a), the silicon device 9 used is prismatic in form, having a silicon to air interface 12 angled to the first interface 11 such that the THz wave in the silicon impinges the silicon to air interface 12 at an angle that is near normal to the plane of the face, hence less than the total internal reflection angle for this interface, and so transmitted through the silicon to air interface 12, but again subject to a Fresnel reflection loss.

A problem with the use of silicon in THz devices is that free carriers can be created when the material is subject to illumination by light at a frequency higher or wavelength shorter than the material band-gap, which in the case of silicon is around 1 micron in wavelength. To limit the effects of stray light, as shown in FIG. 3(b), a screen 13 has been used, described for example by Kawase et al, Applied Optics 40(9), pages 1423-1426 (2001). Here the screen 13 is positioned so that it prevents pump wave light from impinging the prismatic silicon output of a coupling device that is applied to a MgO: LiNbO$_3$ non-linear crystal. In this case, the pump wave light otherwise impinging the silicon prism arises from parasitic reflection from other optical components 14 within the THz parametric generation system.

SUMMARY OF THE INVENTION

According to one aspect of the present invention, there is provided a device comprising a first medium for propagation of an em-wave, a semi-insulator material for coupling the em-wave from the first medium into a second medium of lower refractive index than the first medium, and a filter for filtering out radiation that has a frequency greater or equal to the band gap of the semi-insulator. Preferably, the filter is between the first medium and the semi-insulator material.

By filtering out radiation that can stimulate free carriers in the semi-insulator material, the deleterious effects of free carrier generation can be avoided.

The first medium may be a non-linear crystal. Preferably, the em-wave is generated in the non-linear crystal through the process of parametric generation or difference frequency mixing. Although it has not previously been reported in the art, the inventors have recognised that free carrier generation in the semi-insulator material due to scatter of the pump and/or idler or difference frequency mixing waves within the non-linear medium can have a significant detrimental effect on the transparency of the semi-insulator, particularly at THz frequencies.

The filter may be a dielectric coating designed to be highly reflecting at the pump and/or idler or difference frequency mixing wave wavelengths and applied to the nonlinear crystal or the semi-insulator device or devices. While the materials used in such coatings are usually regarded as being opaque to THz radiation, and hence not appropriate, it is the case that the coating may be typically less than a few hundred nanometers thick in the case of a single layer coating and just a few microns thick in the case of a more complex multi-layer coating. Consequently, materials of high absorption coefficient at THz frequencies may be usefully employed, because absorption over the short path length can be tolerated.

The coating may be a single-layer dielectric coating. The design of the coating is dependent upon the refractive index of the first and semi-insulating material. The media refractive indices determine the coating material refractive index required, while the wavelength of the em radiation determines the thickness. As the coating is designed to block at least some of the scattered pump and/or idler radiation in the case of parametric generation or the scattered difference frequency mixing wave or waves in the case of difference frequency mixing, the design wavelength is usually, but not invariably, in the near-infrared part of the electromagnetic spectrum.

Alternatively, the filter may be a multi-layer dielectric coating. Again, the design of the coating is dependent upon the refractive indices of the first medium and the semi-insulator material. However, the reflection from the coating is a distributed process across all the multiple coating layers. Consequently, a high degree of reflection from such a coating can be achieved independent of the refractive index properties of the medium into which the em radiation is propagating. In the case of a near infrared wave propagating from a non-linear crystal into a semi-insulator material that may have a high refractive index at this wavelength, the affect of the refractive index of the semi-insulator material on the multi-layer dielectric coating design can then be substantially mitigated.

The filter may be an absorbing filter, preferably having an absorption coefficient for the pump and/or idler or difference frequency mixing wave wavelengths that is significantly greater than for THz frequencies, in order that it may be usefully employed to substantially block said pump and/or idler or difference frequency mixing wave wavelengths yet substantially transmit the THz wave. An advantage of this is that the efficacy of the filter in absorbing the near infrared radiation is independent of the angle of incidence at which the infrared radiation impinges the absorbing filter. This can be important as the near infrared radiation to be absorbed arises due to scatter within the non-linear crystal. This scatter will be produced in all propagation directions and so impinge the absorbing filter over a large range of angles.

Suitable materials for an absorbing filter include, for example, plastics, paints, ceramics and papers. Where the thickness of the absorbing filter is of the same order of magnitude as, or greater than, the wavelength of the THz frequency radiation, care must be taken in respect to the refractive index of the filter material used. This is because optical refraction and Fresnel reflection effects must be considered in this regime.

The semi-insulator material may be a semi-conductor material such as silicon.

According to another aspect of the present invention, there is provided a method that involves the use of a filter in a device having a first medium for propagation of an em-wave and a semi-insulator material for coupling the em-wave from the first medium into a second medium of lower refractive index than the first medium, thereby to filter out radiation that has a frequency greater than the frequency that corresponds to the semi-insulator band gap.

BRIEF DESCRIPTION OF THE DRAWING

Various aspects of the invention will now be described for the purpose of example only and with reference to FIG. 4, which is a schematic diagram of a parametric device with a semi-insulator device for improved output coupling.

SPECIFIC DESCRIPTION OF THE DRAWINGS

Figure 1A:
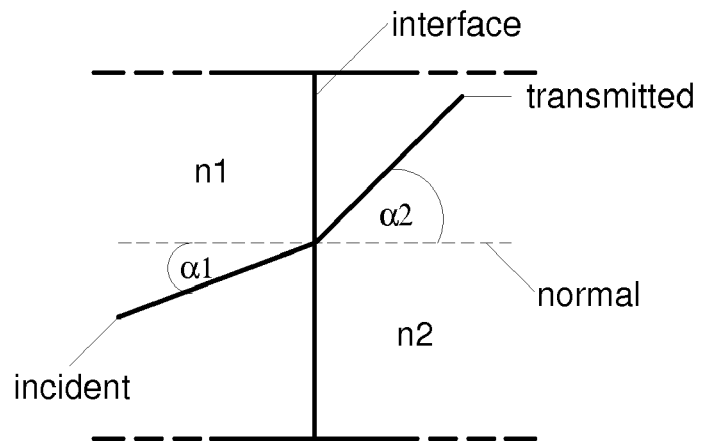
Figure 1B:
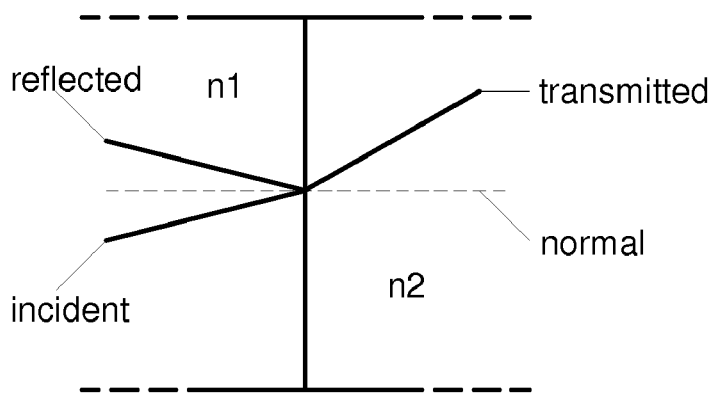
Figure 1C:
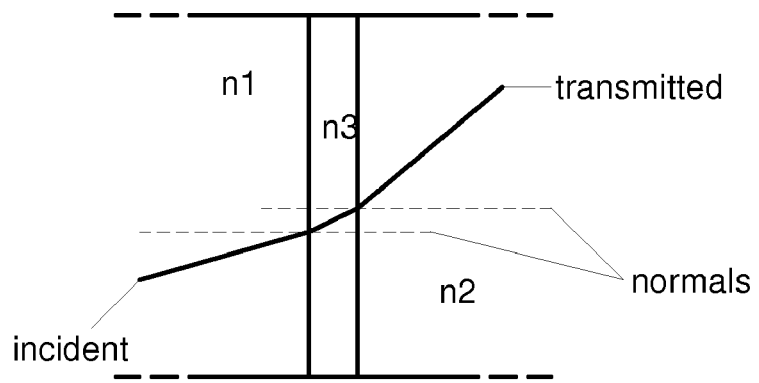
Figure 2A:
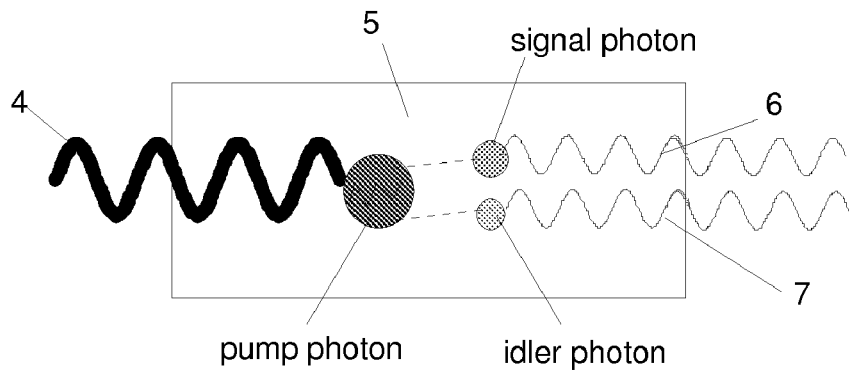
Figure 2B:
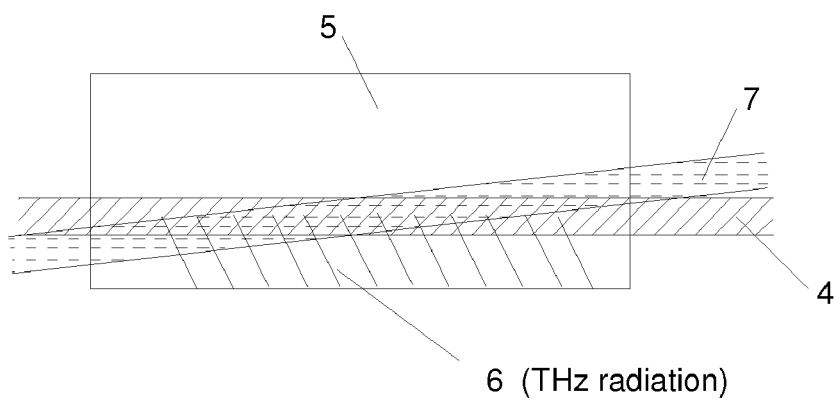
Figure 2C:
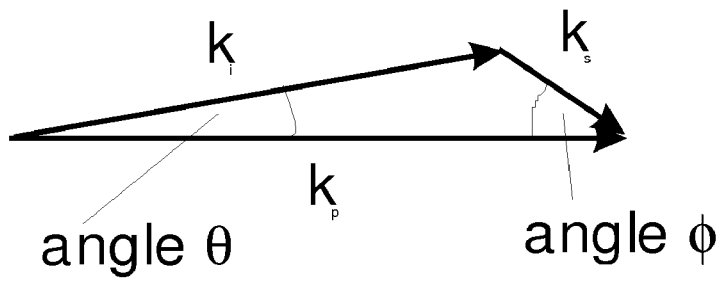
Figure 3A:
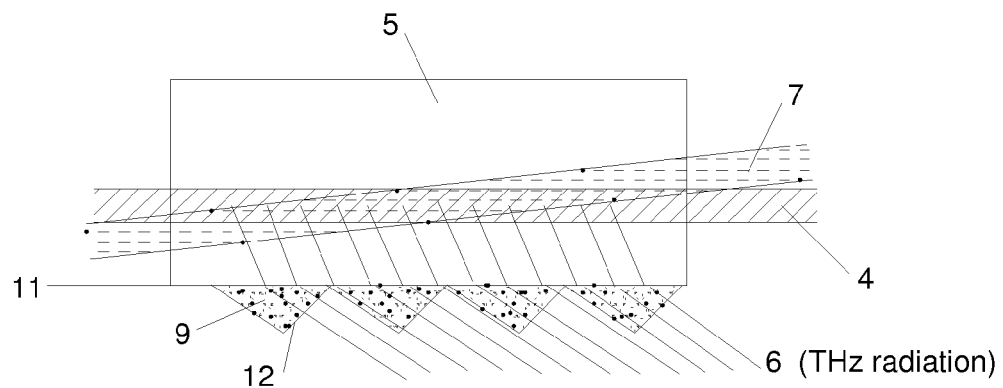
Figure 3B:
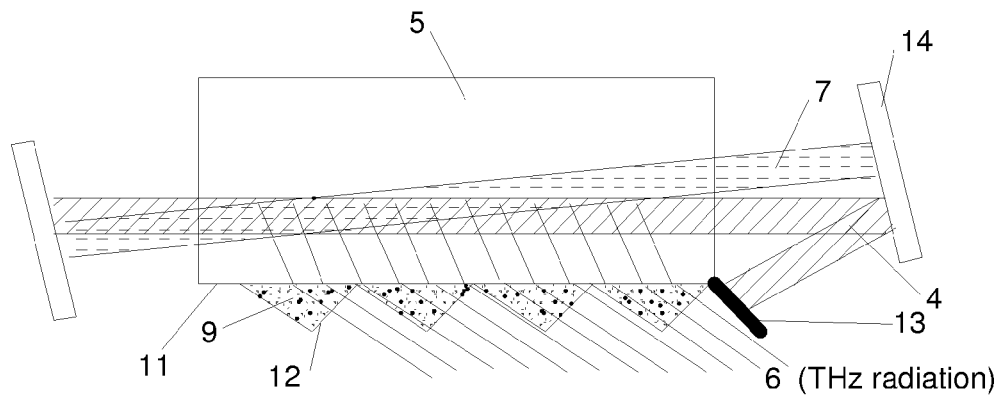
Figure 4:
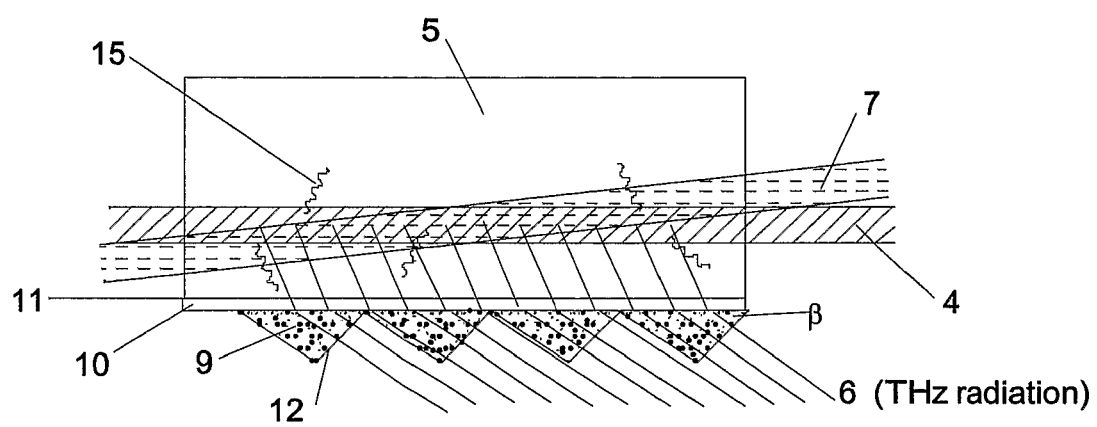

FIG. 4 shows a device for non-collinear parametric generation of THz radiation. This has a nonlinear crystal 5, which in response to a pump wave 4 generates parametrically a signal wave 6 and an idler wave 7. To enable coupling of the generated signal wave 6 from the nonlinear crystal 5, which would otherwise be totally internally reflected, an array of silicon prisms 9 is provided. Between the nonlinear crystal 5 and the array of prisms 9 is a dielectric coating layer 10. This layer 10 is selected so that it can prevent pump wave 4 and idler wave 7 radiation scattered within the nonlinear crystal 5 from impinging the silicon prism array 9. This is provided on an outwardly facing side 11 of the non-linear crystal 5. Any suitable material could be used for the filter provided it is able to block or otherwise prevent transmission of light into the array at the wavelengths of interest. For example, where it is acting as an absorber, the filter may include plastics, paints, ceramics and papers.

In use, as the pump wave 4 and idler wave 7 propagate through the nonlinear crystal 5 they are subject to scattering, resulting in a small proportion of the radiation 15 from these waves propagating in all directions within the nonlinear crystal 5. Some of the scattered radiation impinges the side face 11 of the nonlinear crystal 5 where it is substantially blocked from propagating into the silicon prism array 9 by the single-layer dielectric coating 10. Hence, the signal wave can be coupled into the prism array, whilst free carrier generation is minimised.

As a specific example, the nonlinear crystal 5 is magnesium oxide doped lithium niobate ($MgO:LiNbO_3$). The pump wave 4 is derived from that class of lasers based on the neodymium active ion, for example neodymium yttrium aluminium garnet (Nd: YAG) having a wavelength of 1064 nanometres. It is usual that the pump wave 4 is made to propagate along the crystallographic x-axis of the $MgO:LiNbO_3$ nonlinear crystal 5 with polarisation parallel to the crystallographic z-axis and further that the generated idler wave 7 propagates within the nonlinear crystal 5 at an angle of around 0.7 degrees to the pump wave 4 in the x-y crystallographic plane with polarisation parallel to the crystallographic z-axis.

For this condition the generated signal wave 6 has a frequency of 1.4 THz and propagates at an angle of 65 degrees relative to the pump wave 4. Thus for a nonlinear crystal with sides parallel to the crystallographic x-axis propagation of the signal wave 6 is at an angle of 25 degrees relative to the normal of side face 11. This angle is greater than the total internal reflection angle for a nonlinear crystal to air interface, however, the application of the silicon prism array 9 to the side face 11 allows efficient coupling of the signal wave from the nonlinear crystal into the silicon prism array. The silicon prism array 9 is designed so that the signal wave 6 in the silicon prism array impinges the silicon to air interface 12 at close to normal incidence. The prism angle β to achieve this is around 43 degrees. Preferably the prism array is fabricated from high resistivity (>10 kohm/cm) silicon so that the absorption loss experienced by the signal wave 6 is minimised. By having the filter 10 between the non-linear crystal and the array 9, free carrier generation in the silicon can be minimised.

The above description of a specific embodiment is made by way of example only and not for the purposes of limitations. It will be clear to the skilled person that minor modifications may be made without significant changes to the operation described. For example the coating may be a multi-layer dielectric coating or an absorbing coating or may be applied to the semi-insulator device or devices or may be an appropriate filter, preferably a blocking filter, simply clamped between the semi-insulator and first medium from which the em wave originates.

The invention claimed is:

1. A device comprising a first medium for propagation of an em-wave, a semi- insulator material for coupling the em-wave from the first medium into a second medium of lower refractive index than the first medium, and a filter for filtering out radiation that has a frequency greater than the frequency that corresponds to the semi-insulator band gap but allows the em-wave to pass into the semi-insulator material, wherein the filter is between the first medium and the semi-insulator material.

2. A device claimed in claim 1 wherein the filter comprises one or more dielectric layers.

3. A device as claimed in claim 1 wherein the filter is an absorbing filter.

4. A device as claimed in claim 1 wherein the first medium is a nonlinear crystal.

5. A device as claimed in claim 4, wherein the em wave is generated in the nonlinear medium as a result of a parametric generation process.

6. A device as claimed in claim 1 wherein the semi-insulator material is silicon.

7. A device as claimed in claim 1 wherein the semi-insulator material defines a series of surface discontinuities.

8. A device as claimed in claim 7 wherein the semi-insulator material defines one or more prism shaped elements.

9. A device as claimed in claim 1 wherein the useful electromagnetic radiation has a frequency in the range 0.1 THz to 20 THz.

10. A method comprising:
providing a filter in a device having a first medium for propagation of an em-wave and a semi-insulator material for coupling the em-wave from the first medium into a second medium of lower refractive index than the first medium wherein the filter is provided between the first medium and the semi-insulator material, and
employing the filter to filter out radiation that has a frequency greater than the frequency that corresponds to the semi-insulator band gap but allowing the em-wave to pass into the semi-insulator material.

* * * * *